June 14, 1966     I. BAYANE ETAL     3,255,812

HOT AND COLD FOOD SERVER

Filed June 28, 1963     2 Sheets-Sheet 1

INVENTORS
Irving Bayane
Irving Schatz
BY *Irving Seidman*
ATTORNEY

June 14, 1966     I. BAYANE ETAL     3,255,812
HOT AND COLD FOOD SERVER
Filed June 28, 1963     2 Sheets-Sheet 2
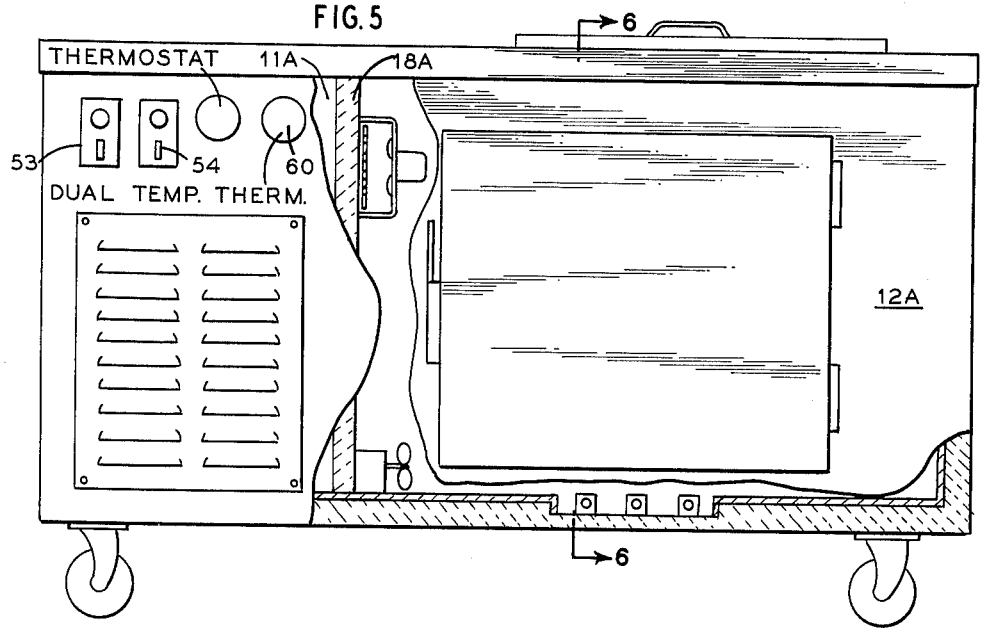
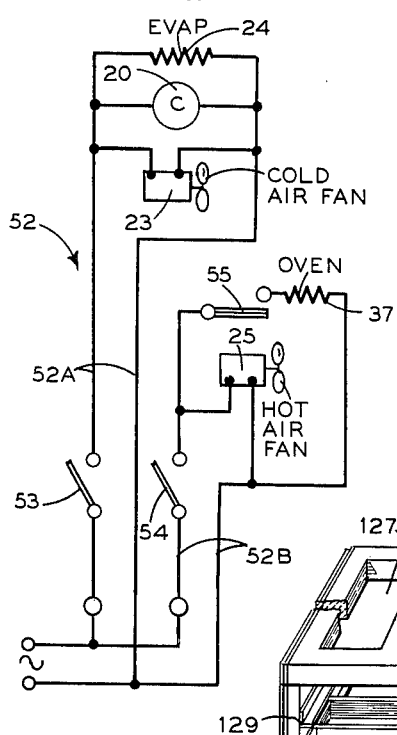
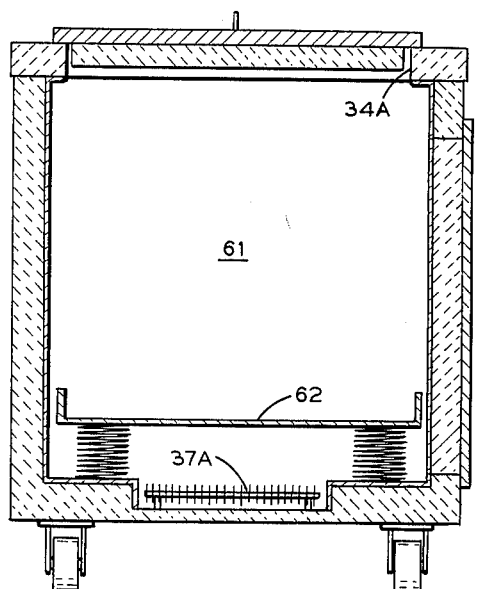
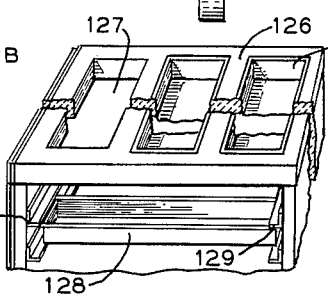
INVENTORS
Irving Bayane
Irving Schatz
BY
ATTORNEY United States Patent Office 3,255,812
Patented June 14, 1966

3,255,812
HOT AND COLD FOOD SERVER
Irving Bayane, 329 W. Hudson Ave., and Irving Schatz, 341 Manor Road, both of Englewood, N.J.
Filed June 28, 1963, Ser. No. 291,534
4 Claims. (Cl. 165—27)

This invention relates to a hot and cold food server, and more specifically to a hot and cold server for facilitating the serving of complete hot or cold meals to large numbers of people with a minimum of personnel and in a minimum of time.

Heretofore, institutional serving of meals, e.g. in schools, hospitals, cafeterias, the military and the like, required the setting up of a complete kitchen and serving line for serving food to large numbers of people serviced by such institutions. Such arrangements required large capital expenditures for equipment and material, and also required a relatively large number of personnel to run and operate such kitchens. Further, the conventionally known ways of serving food in such institutions was relatively slow and tedious. In school cafeterias for example, time is a premium since a relatively large number of children must be fed in a relatively short time period.

Therefore, it is an object of this invention to provide a hot and cold server than can be set up in a minimum of time and with a minimum of expense, yet be capable of serving complete hot or cold meals to large numbers of people simply and quickly.

Another object is to provide a hot and cold server in which relatively large numbers of complete meals can be kept in cold storage until such time as the food is to be dispensed, at which time the meals can then be cooked and/or warmed without removing the meals from their place of cold storage.

Another object is to provide a hot and cold server having a storage and serving section that is rendered readily detachable from the section housing the refrigerating means.

Another object is to provide a hot and cold server comprising a unitary cabinet construction which is compartmentized to effect either cold storage of a relatively larger number of complete meals, or the cooking or heating of the same in situ therein.

Still another object is to provide a hot and cold server in which the meals can be readily dispensed therefrom one at a time.

Still another object is to provide a hot and cold server in which the storage section thereof is readily portable and which can be utilized for transporting comestible products in their frozen state directly from the food processing plant to the distributing outlet.

The foregoing objects and other features and advantages are attained by a hot and cold food server in which the food storage compartment can be selectively cooled or heated for either cold storing or cooking the comestibles therein. Essentially the hot and cold server comprises a cabinet which is compartmentized to define a section for housing the refrigerating means and section for storing and/or cooking the food. The arrangement is such that the food storage and serving section is sufficiently large for containing a relatively large number of complete meals which may be prepackaged and frozen. Means are provided for circulating cooling air through the storage section.

In accordance with this invention a heating means is disposed in the storage section, which when rendered operative will heat or cook the frozen comestibles in situ therein. Control means are provided to selectively operate either the refrigerating means or the heating means. Means are provided for individually serving or dispensing the meals from the storage section one at a time.

In one form of the invention, the storage and heating section is constructed as a section which can be separated from the section housing the refrigerating means. Means are provided for detachably connecting the respective sections together. With this form of the invention a plurality of storage and serving sections can be utilized with a given refrigerating housing section so as to provide a continuous supply of meals with a minimum amount of equipment.

A feature of this invention resides in the provision that the hot and cold server is relatively simple in construction, can be easily fabricated, and is positive in operation.

Another feature resides in the provision that the storage and serving section is rendered detachably connected to the refrigerating housing section.

Still another feature resides in the provision that the detachable section is rendered readily portable and can thereby be rendered readily adapted for transporting the comestibles in their frozen state from the processing plant to the retail outlet, and rendered immediately readied for distribution by simply connecting the same to the refrigerating section of the server.

Another feature resides in the controls for selectively operating the server for either cold storing or heating.

Another feature resides in the provision wherein the respective meals stored in the storage section can be heated, cooked and dispensed therefrom.

Other features and advantages will become more readily apparent when considered in view of the specification and drawings in which:

FIGURE 5 is a modified form of the invention.

FIGURE 6 is a section view taken along line 6—6 of FIG. 5.

FIGURE 7 is a diagrammatic showing of the control circuit for operating either of the embodiments.

FIGURE 8 illustrates another modified form of the invention.

Figure 1:
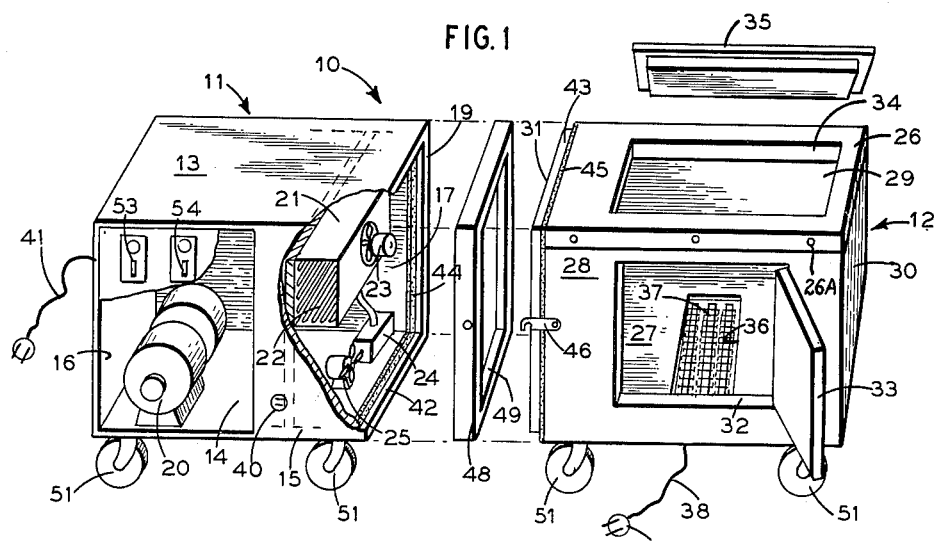
FIGURE 1 is a perspective exploded view illustrating the hot and cold server of this invention.
Figure 2:
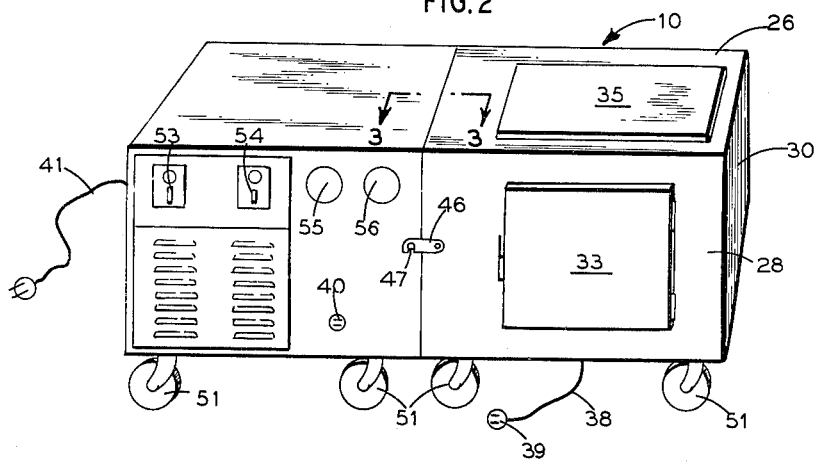
FIGURE 2 is a perspective view of the hot and cold server in position of use.

Referring to the drawing, there is shown in FIGS. 1 and 2 a hot and cold food server 10 of this invention. It comprises essentially of a cabinet composed of two readily separable sections 11, 12. Section 11 forms the housing for the refrigerating means, and section 12 defines a storage and serving section.

The housing section 11 for the refrigerating means is defined by a top and bottom wall 13, 14 respectively which are connected on three sides by end walls 15, 16, and 17 to define a section having one end thereof which is fully open. A transverse portion 18 is spaced inwardly from the open end 19. In the space between the partition 18 and the end wall 16 is the compressor 20 of the refrigerating means. Mounted on the partition 18 is a housing 21 containing the coils 22 through which the refrigerant coolant is pumped. An induced air fan 23 is operatively associated with the coil housing 21 for circulating air in heat transfer relationship to the coils 22 and for circulating cooled air through the storage section 12 when the latter is connected thereto, as will be hereinafter described. Operatively connected to the coil housing is an evaporator 24 for automatically evaporating the condensate forming and draining from the coils 22. Located adjacent the open end 19 of section 11 is a forced draft fan 25 for circulating air through the storage section 12 during the cooking or heating cycle.

The section 12 defining the food storage and serving section is formed as a cabinet having a top and bottom wall 26, 27, connecting opposed side walls 28, 29 and an end wall 30. Thus the storage and serving section 12 is also defined as a cabinet provided with a full open end 31.

In the illustrated embodiment the front wall 28 of section 12 is provided with an access opening 32 closed by a hinged door 33. The upper or top wall 26 of section 12 forms therein an opening 34 which is closed by a removable closure 35. The opening 34 in the top 26 provides the means through which the meals or food is dispensed during the serving of the same. Preferably the walls of the storage and serving section 12 are either lined with a thermal insulating material or are formed of a double wall construction with suitable insulation disposed therebetween.

In accordance with this invention, the bottom wall 27 of the server section is formed with a well or recess 36 for accommodating a heater 37, e.g. an electrically operated heating coil having a series of fins connected thereto. A cord 38 for plugging the heating coils 37 to a suitable source of electrical power is provided. In the illustrated embodiment the plug 39 of cord 38 may be plugged in an outlet 40 formed in section 11, and cord 41 of section 11 being connected to a source of power.

Figure 3:
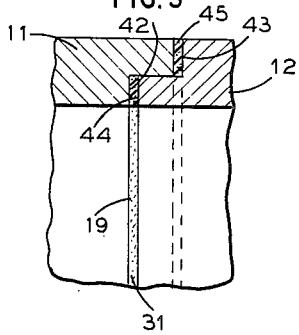
FIGURE 3 is a sectional view taken along line 3—3 illustrating the connection between sections thereof.

To facilitate engagement of the respective sections 11, 12 in end to end relationship to form the hot and cold server, the respective open end 19, 31 of the sections 11, 12 are provided in co-operating interengaging means which mate to form an air tight seal. In the illustrated embodiment the housing section 11 is provided with recessed shoulder portions 42 circumscribing the open end thereof. The server section 12 is provided with complementary external shoulders 43 about its open end 31 which is adapted to be received within the open end 19 of the housing 11 and the respective shoulders 42, 43 abut one another in the assembled position of the server. As best seen in FIG. 3, the projecting end of the respective housing and server sections 11 and 12 has a suitable gasket 44, 45 connected thereto. Thus in the abutting position of the sections 11, 12, the respective shoulders 42, 43 and gaskets 44, 45 thereof define an air tight seal therebetween.

Means are provided for rendering the respective sections 11, 12 detachably secured. As shown, the means includes a latch 46 pivotally mounted to the server section 12 which is adapted to latch a catch pin 47 on the side of the housing 11. Therefore, simply by disengaging the latch, the respective sections 11, 12 can be disengaged.

Figure 4:
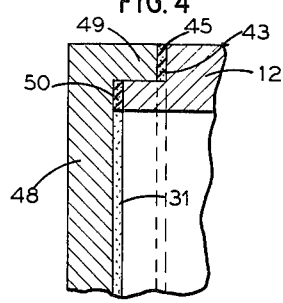
FIGURE 4 is a detail sectional view illustrating the connection of the end closure to the storage section when the latter is separated from the housing section.

When the server section 12 is separated from the refrigerating housing 11, a closure 48 is provided a close the open end 31 thereof. As shown, the closure 48 is provided with a circumscribing flange 49 to form a seal with the end 31 of the server 12, as seen in FIG. 4. The projecting periphery of the closure 48 is provided with a gasket 50 to perfect the seal therebetween.

To render the respective sections 11, 12 readily portable, each is provided with a set of casters or wheels 51. Thus the respective sections 11, 12 or combined sections can be easily moved to a given desired location.

The control circuit 52 for the server 10, described, is shown in FIG. 7. As shown the compressor 20 and the heat means 37 are connected in parallel. The circuit 52A to the compressor and the circuit 52B to heater 37 are controlled by respective switches 53, 54 which are physically located on the front wall of the refrigerating section 11. The fan 23 for circulating the cold air is connected in the compressor circuit 52A in parallel with the compressor 20. Also in parallel with the compressor 20 is the evaporator 24.

In the heater circuit 52B the hot circulating air fan 25 is connected in parallel with the heater 37. In series with the heater 37 is a thermostat 55. From the control circuit 52 shown, it will be apparent that the refrigerating cycle or heating cycle can be independently controlled by closing the proper switch 53, 54.

In operation, it will be noted that an institution utilizing the server 10 described may operate with at least one refrigerating section 11 and one or more server sections 12. However, it will be understood that one or more refrigerating sections may be used in a given installation.

The food storage and serving section 12 for example may be filled with a relatively large number of individually packaged dinners or meals which are frozen and maintained frozen until readied for serving. The food servers 12 for example may be filled at a processing plant and shipped to the given institution which will have a refrigerating section 11. When the loaded storage and serving section 12 is received by the institution, it can be immediately connected to the refrigerating section 11, and the food therein retained in cold storage state. This is readily attained by closing switch 53 to energize the compressor circuit 52A. If desired a temperature control and indicating means 56 may be included to maintain a substantially constant temperature during the operation of the refrigerating cycle.

When the time has arrived to serve the meals so stored hot, the switch 53 is opened and switch 54 controlling the heating cycle is closed. Closing switch 54 will energize the heater 37 and operate the hot air fan 25 accordingly. A thermostat 55 in the circuit is provided to maintain a substantially constant heating or cooking temperature. Thus it will be apparent that the food or dinners are cooked in situ. After the dinners are cooked, the temperature may be lowered until all the dinners have been served.

Dispensing of the individual dinners or food from the server section 12 is readily attained by removing the closure 35, and having the respective patrons to pass in line pass the server and remove one of the meals from the server 12. A spring operated magazine rack is disposed within the server to automatically elevate the dinners one at a time through the opening 34 in the server 12.

Accordingly, the serving of meals can be readily served with a minimum of effort. When one storage cabinet or section 12 is exhausted, the exhausted section 12 can be readily detached from section 11, and another full storage section 12 connected thereto. In this manner a continuous uninterrupted serving of meals can be effected for serving the maximum number of meals in a minimum of time, and with a minimum of personnel.

FIGURES 5 and 6 illustrate a modified form of the invention. In this form, the refrigerating section 11A and storage section 12A are formed in an integral cabinet construction. In all other respects, it is essentially the same as described with reference to the form of FIGS. 1 and 2.

In the form of FIGS. 5 and 6, integral cabinet is provided with a partition 18A for defining therein a compartment 60 for housing the compressor and a compartment 61 for defining a storage area. As shown in FIG. 6, the storage area 61 has located therein a rack 62 for individually dispensing a meal one at a time through opening 34A in the top of the cabinet, similar to a rack which may be incorporated in the storage cabinet of FIGS. 1 and 2. The rack 62 is spring loaded so that it will automatically elevate the food as it is lightened. A heater means 73A is located in the bottom of the storage compartment 61. The refrigeration means including coils and evaporator are similar to that previously described. In every other respect the construction and operation of the server of FIGS. 5 and 6 is similar to that of FIGS. 1 and 2. The control circuit for the server of FIGS. 5 and 6 is also similar to that of FIG. 7 as described.

Thus from the foregoing it will be apparent that the hot and cold food server in either form is relatively simple in structure and positive in operation. It can be readily set up to serve the maximum number of people in a minimum of time. The readily separable storage section of the form of the invention shown in FIGS. 1 to 4 further facilitates shipping of the food from plant to distributor, as well as for effecting the storage and cooking of the food with a minimum of handling.

If desired the top wall 26 of the storage section 12 may be rendered completely removable simply by the removal of suitable fasteners 26A, and in place thereof a modified top 126 substituted. See FIG. 8. In this form of the invention the storage unit 112, modified, may be converted into a serving table from which various comestibles may be served from bulk. Accordingly, the modified top 126 is provided with a series of openings 127 for receiving a pan from which various foods, prepared in bulk, can be served. It will be noted that the openings 127 are in communication with the interior of the storage cabinet 112. Thus by energizing its heater, as described with reference to FIG. 1, the circulating hot air may be utilized to keep the food in pans disposed in opening 127 warm. Thus the cabinet 112 can function very much in the nature of a conventional steam table, but with the complete elimination for the need of any water, drains and the like required with steam tables.

The interior of the cabinet 112 may be used to store additional food pans 128 which may be placed in openings 127 in top 126. To support the pans 128 in the storage area of cabinet 112, the lift as described with reference to FIGS. 1 and 6 is removed therefrom, and a series of angle brackets 129 are installed therein. The angle brackets 129 may be detachably connected to the interior walls of the cabinet 112 by any suitable means. Thus the pan 128 may be supported in vertically spaced relationship between opposed brackets 129. As the pans 128 supported in openings 127 are exhausted, a full pan 128 may be removed from the cabinet 112 and placed in the top thereof. By a single manipulation of interchanging tops, the server of FIG. 1 may be converted into a hot serving table similar in operation to a conventional steam table.

It will be appreciated that the top of the integral cabinet construction of FIGS. 5 and 6 may likewise be bodily removed and have substituted in its stead an aperture top similar to that shown in FIG. 8, but sized to accommodate the top of the integral cabinet. In operation, it would be similar to that described with reference to FIG. 8.

In all other respects the constructions of cabinet 112, and the similar modified version (not shown) of the integral cabinet construction of FIGS. 5 and 6 are similar to that herein before described.

While the instant invention has been disclosed with respect to several embodiments thereof, it will be appreciated that variations and modifications thereof may be made within the scope and spirit of the invention.

What is claimed is:

1. A hot and cold food server for cold storing food and for heating or cooking the same for prior to serving the same comprising,
  (a) a sectional cabinet including,
  (b) a housing section, and a storage and serving section,
  (c) refrigerating means housed within said housing section,
  (d) said refrigerating means including a compressor, cooling coils operatively associated therewith, and a fan for circulating air over said coils,
  (e) said housing section having a full open end,
  (f) said storage and serving section having an open end, the open end of said serving section being adapted to engage the open end of said housing,
  (g) means for detachably connecting said serving section in end to end relationship to said housing section,
  (h) gasket means circumscribing the open ends of the respective sections to define a tight seal therebetween when said sections are attached together,
  (i) said means for detachably securing the same together including a pivoting latch connected to one section, and a co-operating catch connected to the other section,
  (k) a heating means located in said server section,
  (l) said heating means being activated to heat the food stored in said serving section,
  (m) a fan for circulating heated air through said server section when said heating means is activated,
  (n) a control circuit for energizing the refrigerating means or heating means for selectively operating one or the other depending on whether cold storing or cooking of the food stored in said serving section is desired.

2. The invention as defined in claim 1 and including,
  (a) means defining an opening in the top of said serving section,
  (b) a dispensing rack located in said serving section for dispensing the food stored in said compartment.

3. A hot and cold food server for cold storing food and for heating or cooking the same prior to serving the same comprising,
  (a) a sectional cabinet including,
  (b) a housing section, and a storage and serving section,
  (c) refrigerating means housed within said housing section,
  (d) said refrigerating means including a compressor, cooling coils operatively associated therewith, and a fan for circulating air over said coils, and through said storage section,
  (e) said housing section having an open end, and
  (f) said storage and serving section having an open end arranged to be connected to the open end of said housing,
  (g) gasket means circumscribing the open ends of the respective sections to define a fluid tight seal therebetween when attached,
  (h) means for detachably securing said sections together,
  (j) a heating means located in said server,
  (k) said heating means being activated to heat the food stored in said serving section,
  (l) a fan for circulating air through said server section when said heating means is activated,
  (m) a control circuit for selectively operating the refrigerating means or heating means depending on whether cold storing or cooking of the food stored in said serving section is desired,
  (n) and thermostatic means in said circuit for maintaining the temperature substantially constant when said heating unit is energized.

4. The invention as defined in claim 3 wherein,
  (a) said serving section has a removable top wall,
  (b) and a second top wall adapted to be interchangeable therewith to convert the same into a serving table from which individual servings may be dispensed from food prepared in bulk,
  (c) said second top having a series of openings therein disposed in open communication with the interior of said serving section.

References Cited by the Examiner

UNITED STATES PATENTS

| | | | |
|---|---|---|---|
| 1,949,663 | 3/1934 | Sellman | 62—448 |
| 2,309,513 | 1/1943 | Kramer | 165—48 X |
| 2,489,510 | 11/1949 | Wagner | 165—48 X |
| 2,550,040 | 4/1951 | Clar | 165—75 X |
| 2,616,269 | 11/1952 | Reynolds | 165—61 X |
| 2,798,367 | 2/1957 | Earle | 62—449 X |
| 2,828,947 | 4/1958 | Hedbom | 165—166 |
| 3,042,384 | 7/1962 | Bauman | 165—75 X |
| 3,135,316 | 6/1964 | Foster et al. | 165—12 |

ROBERT A. O'LEARY, *Primary Examiner.*

CHARLES SUKALO, FREDERICK L. MATTESON, JR., *Examiners.*

M. A. ANTONAKAS, *Assistant Examiner.*